United States Patent
Xu et al.

(10) Patent No.: US 7,034,512 B2
(45) Date of Patent: Apr. 25, 2006

(54) HYSTERETIC CONTROLLED SWITCH REGULATOR WITH FIXED OFF TIME

(75) Inventors: Jingwei Xu, Plano, TX (US); Zbigniew J. Lata, Plano, TX (US); William E. Grose, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 204 days.

(21) Appl. No.: 10/680,999

(22) Filed: Oct. 8, 2003

(65) Prior Publication Data

US 2005/0007084 A1   Jan. 13, 2005

Related U.S. Application Data

(60) Provisional application No. 60/486,391, filed on Jul. 11, 2003.

(51) Int. Cl.
*G05F 1/40* (2006.01)
(52) U.S. Cl. ........................ 323/283; 323/351
(58) Field of Classification Search .............. 323/282, 323/283, 284, 285, 286, 287, 222, 241, 351
See application file for complete search history.

(56) References Cited

U.S. PATENT DOCUMENTS

| 5,481,178 A | 1/1996 | Wilcox et al. |
| 5,770,940 A | 6/1998 | Goder |
| 6,172,492 B1 * | 1/2001 | Pletcher et al. ............. 323/284 |

* cited by examiner

*Primary Examiner*—Jessica Han
(74) *Attorney, Agent, or Firm*—William B. Kempler; W. James Brady, III; Frederick J. Telecky, Jr.

(57) ABSTRACT

System for providing a switched regulator with an adjustable operating frequency range. A preferred embodiment comprises a voltage supply and a load, a switch and filter block (SFB) (such as the SFB 510), a comparator (such as the comparator 520), and a fixed off time logic (FOTL) (such as the FOTL 525). The comparator compares an output voltage with a reference voltage. When the output voltage is equal to or exceeds the reference voltage, the comparator asserts a value on a signal line to the FOTL. The FOTL then shuts down the SFB for a specified period of time. During the off time, the output voltage decays. After the specified period of time expires, the SFB is turned back on and the output voltage can recharge. The duration of time that the SFB remains on is a function of the supply voltage, thus permitting an adjustable operating frequency.

20 Claims, 6 Drawing Sheets

Figure 6

HYSTERETIC CONTROLLED SWITCH REGULATOR WITH FIXED OFF TIME

This application claims the benefit of U.S. Provisional Application No. 60/486,391, filed on Jul. 11, 2003, entitled "Hysteric Controlled Switch Regulator with Fixed Off Time," which application is hereby incorporated herein by reference.

TECHNICAL FIELD

The present invention relates generally to a system for providing regulated voltages, and more particularly to a system for providing a regulator with an adjustable operating frequency range.

BACKGROUND

A hysteretic controlled switching regulator is typically used to provide a constant and predetermined output voltage to a load. Input to the hysteretic controlled switching regulator may typically be a fluctuating voltage source. As an example, a commonly used application of a hysteretic controlled switching regulator would be in the conversion of rectifier output in a standard AC adaptor (which can have a significant amount of ripple) to stable DC output that can be used in a wide variety of electronic equipment, such as computers, peripherals, and so forth. By adjusting the duty cycle of the switching, the output voltage can be controlled to vary within a certain range. A hysteretic comparator can be used to adjust the duty cycle.

A problem that can arise with hysteretic controlled switching regulators is that when it is driving a light load, the switching frequency may enter the range of human hearing (i.e., less than 20 kilo-hertz). This may then lead inductive components connected to the switching regulator to generate audible noise. The noise generated can be highly undesirable by users of the electronic equipment, and therefore is typically unwanted.

One solution uses a fixed switching frequency and a forced off time (a time when the switching regulator is forced into the off state) to ensure that the switching frequency does not enter the range of human hearing. By fixing the switching frequency of the switching regulator, it would be impossible for the switching frequency to drift off into hearing range.

One disadvantage of the prior art is that the forced off time and the fixed frequency requires a higher minimum supply voltage due to the fact that there is a maximum ratio for on time to off time.

A second disadvantage of the prior art is that it operates at a fixed frequency and cannot adjust its operating frequency dynamically. Therefore, to make adjustments to the operating frequency, designers need to make the adjustments.

SUMMARY OF THE INVENTION

These and other problems are generally solved or circumvented, and technical advantages are generally achieved, by preferred embodiments of the present invention which provides a system for providing a switched regulator with an adjustable operating frequency range.

In accordance with a first embodiment of the present invention, a circuit includes a flip flop coupled to an output of a comparator. A fixed off time/counter unit (FOTCU) is coupled to the flip flop. The FOTCU contains circuitry to generate a signal for a specified amount of time and to reset itself once the specified amount of time expires. A gate has inputs coupled to the FOTCU and the output of the comparator. The gate controls the propagation of the output of the comparator when the signal generated by the FOTCU is inactive.

In accordance with another embodiment of the present invention, a hysteretic controlled switch regulator includes a switch and filter unit (SFU) having an input coupled to an input voltage and an output coupled to a load. The SFU contains circuitry to convert a direct current (DC) voltage with ripple into a stable DC output voltage. A comparator is coupled to the SFU. The comparator compares an output voltage generated by the SFU with a reference voltage. A fixed off time unit (FOT) is coupled to the comparator and the SFU. The FOT contains circuitry to control the operation of the SFU.

An advantage of a preferred embodiment of the present invention is that it has an adjustable operating frequency range that can be adjusted based on a supply voltage. Therefore, the regulator can be adjusted to operational requirements.

A further advantage of a preferred embodiment of the present invention is that it has relatively low overhead, wherein the supply voltage level is not significantly larger than the output voltage level. Under heavy load, the regulator can adjust its switching frequency to (1-Vout/Vin)/Toff.

Yet another advantage of a preferred embodiment of the present invention is that with light loads, the switching frequency does not enter the range of human hearing, thus keeping the operation of the regulator quiet. As an upper limit, the regulator operates at its highest frequency under very light load, approaching 1/Toff.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a circuit for producing regulated DC voltages. The invention may also be applied, however, to other applications, such as projects requiring voltage regulators.

Figure 1:
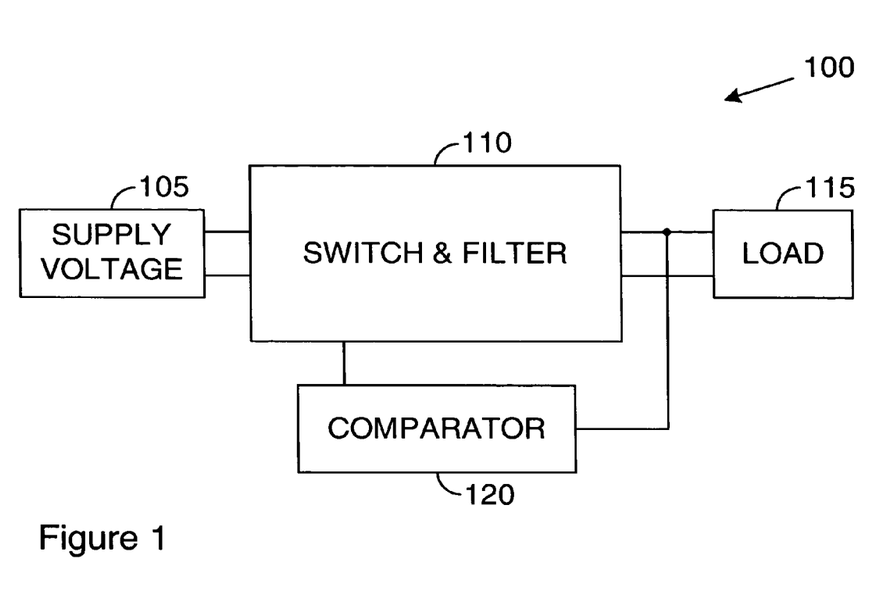
FIG. 1 is a diagram of a high-level view of a hysteretic controlled switch regulator.

With reference now to FIG. 1, there is shown a diagram illustrating a high-level view of a hysteretic controlled switch regulator (HCSR) 100. The HCSR 100 may be divided into four distinct parts: a supply voltage 105, a switch and filter block (SFB) 110, a load 115, and a comparator 120. The supply voltage 105 may be a fluctuating voltage source which the hysteretic controlled switch regulator is regulating. The supply voltage 105 may be represented as a fluctuating direct current (DC) voltage supply. The load 115 can be representative of circuitry that is making use of the regulated voltage. A simplistic model of the load 115 can be a resistor.

The SFB 110 can contain a controllable switch (not shown) whose state (ON or OFF) can determine if the supply voltage 105 is coupled to the load 115. The controllable switch may often be made out of a transistor, such as an NMOS transistor, for example. The SFB 110 can contain a filter (not shown), typically a low-pass filter, to help smooth out the output voltage. Finally, the comparator 120 can be used to compare the output voltage against a permitted voltage range. If the output voltage is within the permitted voltage range, then the switch (in the SFB 110) can remain ON. If the output voltage is not within the permitted voltage range, then the switch will be turned OFF.

Figure 2:
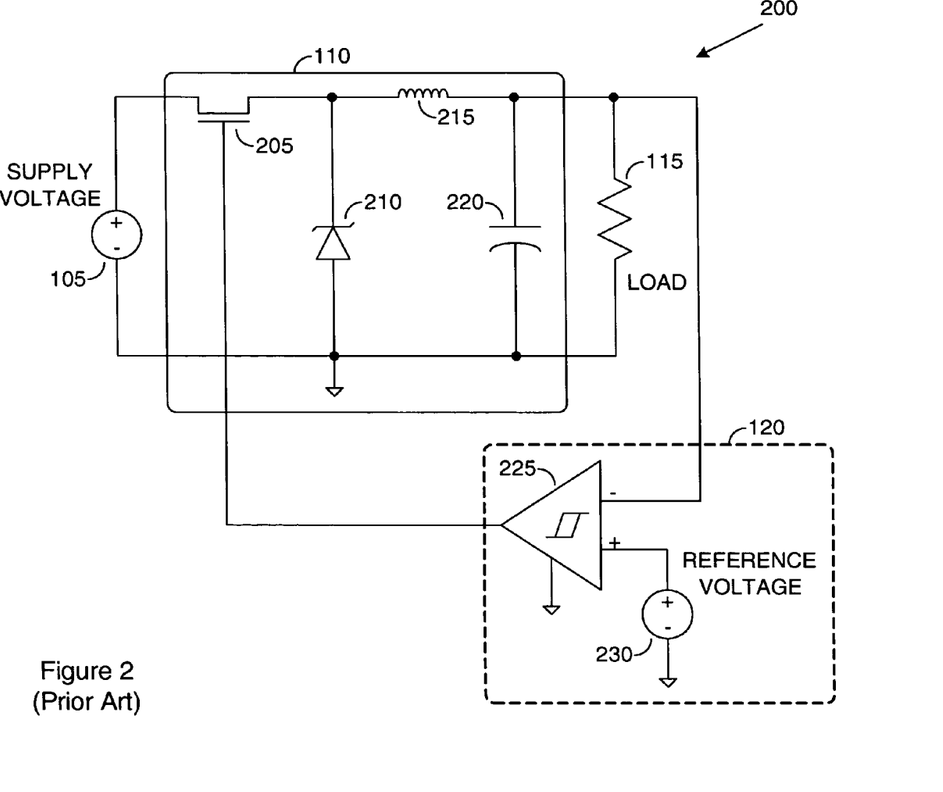
FIG. 2 is a diagram of a detailed view of a prior art hysteretic controlled switching regulator.

With reference now to FIG. 2, there is shown a diagram illustrating a detailed view of a prior art HCSR 200. The HCSR 200, as displayed in FIG. 2, may be representative of a classical design for an HCSR. A fluctuating voltage source can be used to represent the supply voltage 105, while a resistive load can be used to represent the load 115.

The switch from the SFB 110 can be created using an NMOS transistor 205, while the filter (typically low-pass) can be made from an inductor 215 and a capacitor 220. A diode 210 can be used to provide a current path when the switch (NMOS transistor 205) is opened. Note that it is possible that other implementations for the switch and filter can be used in place of the circuitry described above.

The comparator 120 can be made from a comparator 225 with hysteresis, wherein the hysteresis of the comparator 225 can be used to determine the permitted voltage range. The comparator 120 compares an output voltage with a reference voltage (provided by a reference voltage supply 230). Output of the comparator 120 can be used to control the state of the NMOS transistor 205.

A problem with the HCSR 200 is that the operating frequency of the HCSR 200 can vary widely depending upon the magnitude of the load 115 and the magnitude of the supply voltage 105. For example, it is possible for the operating frequency of the HCSR 200 to enter the range of human hearing (a frequency of less than 20 kilo-hertz). When this occurs, the inductive components of the HCSR 200 may produce noise that is audible to users of the HCSR 200. One way to control the operating frequency of an HCSR is to force a fixed operating frequency and a forced off time.

Figure 3:
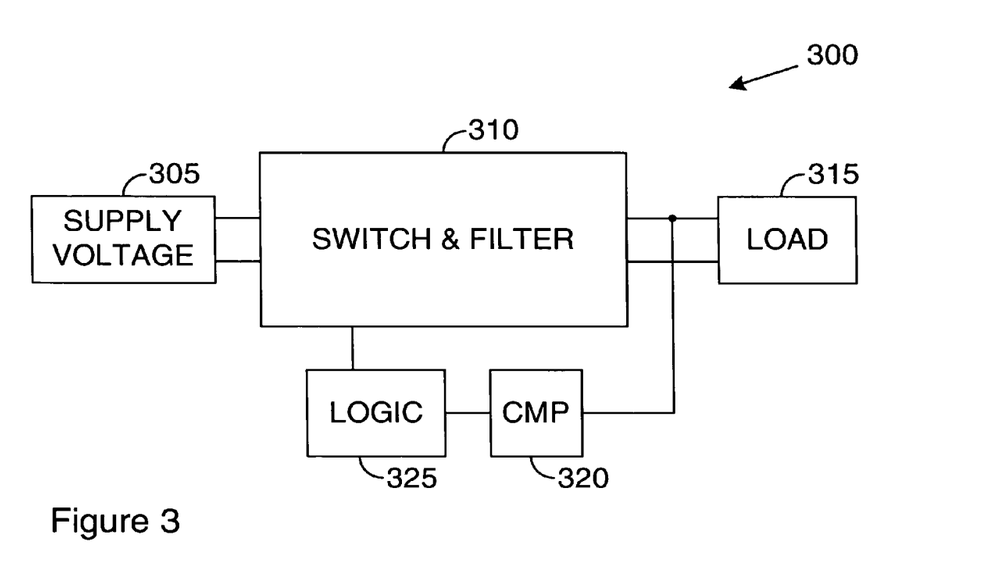
FIG. 3 is a diagram of a high-level view of a hysteretic controlled switching regulator which makes use of logic to provide a fixed operating frequency and a forced off time.

With reference now to FIG. 3, there is shown a diagram illustrating a high-level view of an HCSR 300 which makes use of logic to provide a fixed operating frequency and a forced off time. The high-level view of the HCSR 300 is similar to the high-level view of the HCSR 100 (FIG. 1) and includes a switch and filter block 310 coupled between a supply voltage 305 and a load 315. In this embodiment, a logic block 325 is coupled to the output of a comparator 320. The logic block 325 can be used to force the HCSR 300 to be in the off state for a specified amount of time (the forced off time). Additionally, the logic block 325 can also force the HCSR 300 to operate at a fixed frequency. The logic block 325 will be discussed in greater detail below. Note that since the logic block 325 is controlling the operation of the HCSR 300, a simple comparator can be used to implement the comparison of the output voltage with a reference voltage (i.e., the comparator 320).

Figure 4:
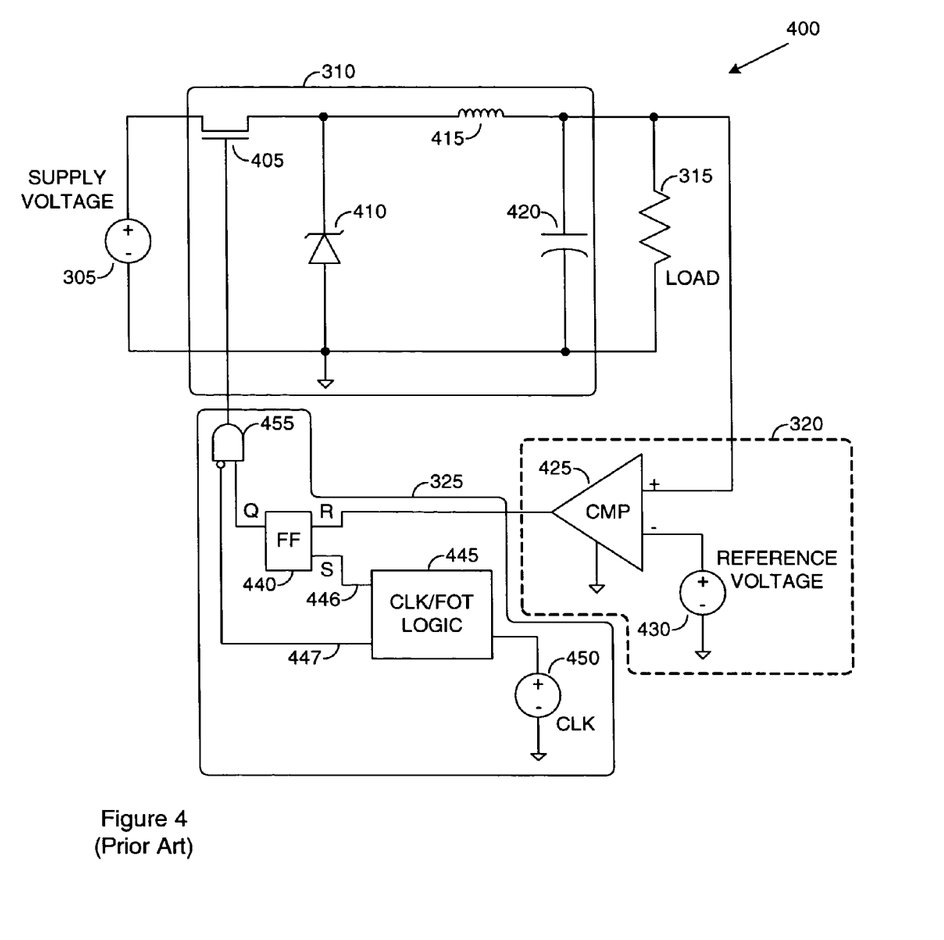
FIG. 4 is a diagram of a detailed view of a prior art hysteretic controlled switching regulator which makes use of logic to provide a fixed operating frequency and a forced off time.

With reference now to FIG. 4, there is shown a diagram illustrating a detailed view of a prior art HCSR 400 which makes use of logic to provide a fixed operating frequency and a forced off time. The HCSR 400, as illustrated in FIG. 4, may be a possible implementation of the HCSR 300 of FIG. 3. A voltage source can be used to represent the voltage supply 305 that is to be regulated, while a resistor can be used to represent the load 315. As in the case of the HCSR 200 (FIG. 2), an NMOS transistor 405, inductor 415, and capacitor 420 combination can be used to create the SFB 310. A diode 410 can provide a current path when the NMOS transistor 405 is open.

As discussed above, with the logic block 325 controlling the operation of the HCSR 300, the comparator 320 may be a simple (non-hysteresis) comparator. A comparator 425 can be used to compare the output voltage with a reference voltage (provided by a reference voltage supply 430). The comparator 425 simply compares the output voltage with the reference voltage and asserts a value at its output depending upon its inputs.

The output of the comparator 425 can be provided to the logic block 325, where it can be provided to a flip flop 440 (preferably an R-S flip flop). The output of the comparator 425 can be the reset (R) input of the R-S flip flop 440. A clock and forced off time logic block 445, having a clock 450 as its input, may be used to provide two outputs: a switch_clock output 446 (coupled to the flip flop 440, preferably the set (S) input) and a forced_off_time output 447. The clock and forced off time logic block 445 may be implemented as simply as a state machine that is used to count the number of clock edges. For example, after counting a number of clock edges, the clock and forced off time logic block 445 may assert the switch_clock output 446 and then after counting a number of clock edges, the clock and forced off time logic block 445 may assert the forced_off_time output 447. The number of clock edges counted for the assertion of the outputs of the clock and forced off time logic block 445 can be adjusted to adjust the operating frequency and the forced off time of the HCSR 400.

The forced_off_time output 447 and output from the flip flop 440 may then be provided to a logic gate 455 (preferably an AND gate), with the forced_off time output 447 being inverted prior to the logic gate 455. Output of the logic gate 455 can be used to control the NMOS transistor 405. With the forced_off_time output 447 inverted, the output of the logic gate 455 remains low (for example a binary zero) as long as the forced_off_time output 447 remains high (for example a binary one). Therefore, as long as the forced_off_time output 447 remains high, the NMOS transistor 405 is in the off state. When the forced_off_time output 447 is low, then the output of the logic gate 455 (and subsequently the state of the NMOS transistor 405) depends upon the output of the comparator 425. The switch_clock output 446 can be used to control the output of the flip flop 440, and hence force a duty cycle on the operating frequency of the HCSR 400.

The fixed operating frequency of the HCSR 400 does not permit the HCSR 400 to dynamically adjust itself for different supply voltages. Additionally, the supply voltage may need to be significantly larger in magnitude than the output voltage, making the HCSR 400 inefficient.

Figure 5:
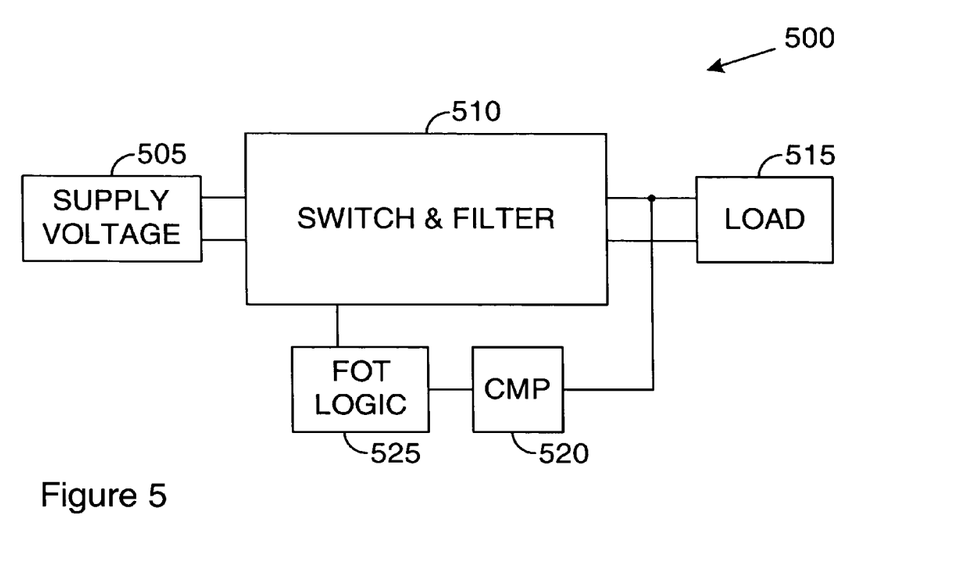
FIG. 5 is a diagram of a high-level view of a hysteretic controlled switching regulator which makes use of a fixed off time logic to provide both an upper and a lower limit on switching frequency and adjustable operating frequency, according to a preferred embodiment of the present invention.

With reference now to FIG. 5, there is shown a diagram illustrating a high-level view of a HCSR 500 which makes use of fixed off time logic 525 to provide both an upper and a lower limit on switching frequency and an adjustable operating frequency, according to a preferred embodiment of the present invention. According to a preferred embodiment of the present invention, the HCSR 500 has a high-level structure that shares some common features with that of the HCSR 300 (FIG. 3), including: a supply voltage 505, an SFB 510, a load 515, and a comparator 520. As previously, the supply voltage 505 may represent a fluctuating DC output with a certain amount of ripple. For example, the supply voltage 505 may be representative of an output of a rectifier output of an AC adaptor. The load 515 may represent circuitry coupled to the HCSR 500, making use of the regulated voltage. In a simplistic model, a simple resistor may be used to represent the load 515. The SFB 510 can be used to switchably couple the supply voltage 505 to the load 515. According to a preferred embodiment of the present invention, a switch can be used to couple the supply voltage 505 to the load 515. Additionally, the SFB 510 may provide a level filtering to help smooth out the output voltage. Preferably, a low pass filter can be used to provide the needed filtering.

The comparator 520 may be used to compare the output voltage (measured across the load 515) with a reference voltage. A function of the comparator 520 may be to provide information regarding the value of the output voltage. For example, the comparator 520 may notify the HCSR 500 when the output voltage is greater than, equal to, or less than the reference voltage. Note that since a fixed off time logic (FOTL) 525 can be used to provide control to couple the supply voltage 505 to the load 515, a comparator with hysteresis may not be needed, although one may still be used.

The FOTL 525 can be a logic block that takes an output of the comparator 520 and, based upon information provided by the comparator 520, control the state of the switch in the SFB 510. For example, if the output voltage is outside of a desired range, then the FOTL 525 may decouple the supply voltage 505 from the load 515. Additionally, the FOTL 525 may also force the HCSR 500 to turn off for a period of time. This fixed off time can be used to set a maximum switching frequency of the HCSR 500. Furthermore, the FOTL 525 can adjust the operating frequency of the HCSR 500 based on the magnitude of the load 515 and the magnitude of the supply voltage 505.

Figure 6:
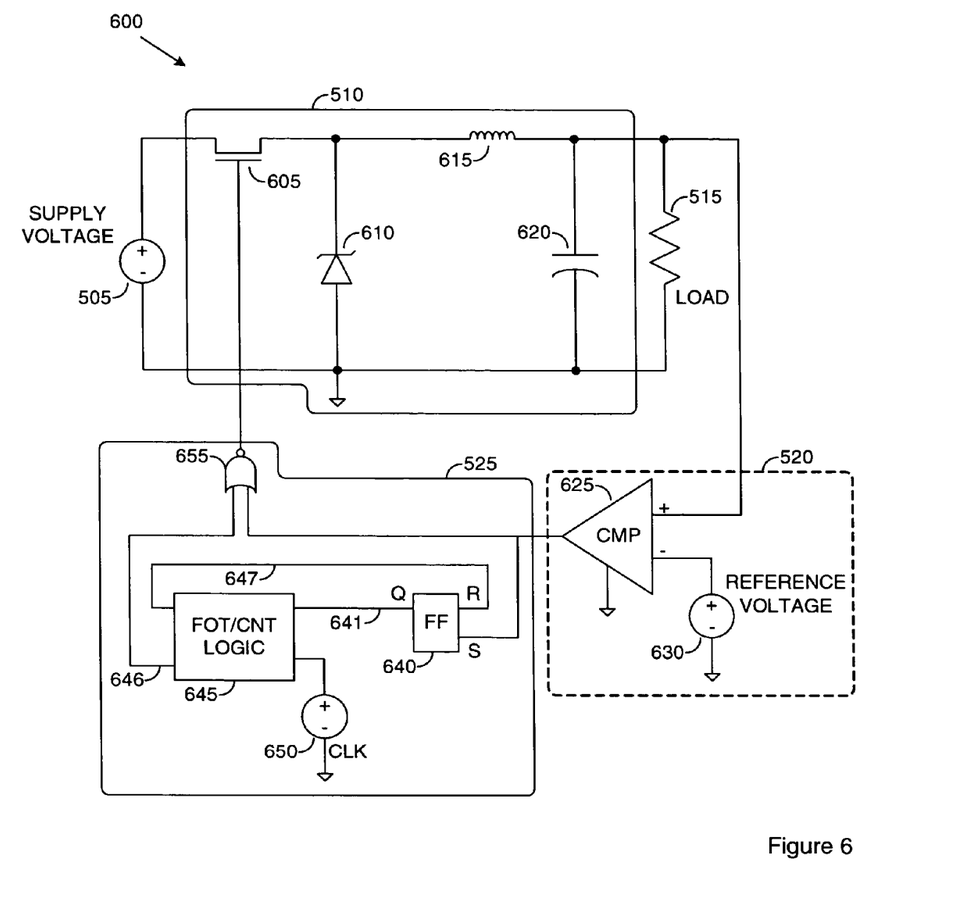
FIG. 6 is a diagram of a detailed view of a hysteretic controlled switching regulator which makes use of logic to provide a fixed off time and an adjustable operating frequency, according to a preferred embodiment of the present invention.

With reference now to FIG. 6, there is shown a diagram illustrating a detailed view of an HCSR 600 which makes use of fixed off time logic to provide an upper limit on switching frequency and an adjustable operating frequency, according to a preferred embodiment of the present invention. According to a preferred embodiment of the present invention, a voltage supply 505 may represent the supply voltage, which can be a fluctuating DC voltage with a certain amount of ripple. Additionally, a resistor 515 may represent an output load of the HCSR 600. The output load may be representative of circuitry attached to the HCSR 600 in an actual application.

An SFB 510, which provides switching and filtering capabilities, may be implemented from several components. For example, a transistor 605 (preferably an NMOS transistor) can function as a switch. The gate of the transistor 605 can be coupled to a control signal line from logic designed to control the operation of the HCSR 600. An inductor 615 and a capacitor 620 can be used to provide desired filtering. Finally, a diode 610 can be used to provide a path for current when the transistor 605 is in the ON state. Note that different arrangements of different components can be used to provide the needed switching and filtering capabilities. For example, a more complex design can be implemented for the filtering to provide a higher order filter.

A comparator 520, to be used to compare the output voltage of the HCSR 600 with a reference voltage, may be implemented with a two-input comparator 625, with one input being the output voltage and another input being the reference voltage that can be provided by a reference voltage supply 630. According to a preferred embodiment of the present invention, the comparator 520 may be configured so that it will assert an active value on its output when the output voltage is greater than or equal to the reference voltage.

An FOTL 525 can be used to control the operation of the HCSR 600 by controlling the state of the switch (transistor 605) in the SFB 510. The FOTL 525 can, based upon the value of the output voltage, turn the HCSR 600 on or off, force the HCSR 600 off for a period of time, and adjust the switching frequency of the HCSR 600. According to a preferred embodiment of the present invention, the FOTL 525 has as an input, and an output from the comparator 520. As discussed previously, the comparator 520 compares the output voltage with a reference voltage (provided by the reference voltage source 630) using the two-input comparator 625 and produces an output depending on the two values. The output of the comparator 520 can be provided to a flip flop 640 (preferably an R-S flip flop). Note that it is possible to use other types of flip flops (such as J-K, D, and T flip flops), possibly with some necessary translation logic. The output of the comparator 520 may be provided to a set (S) input of the flip flop 640. An output 641 of the flip flop 640 can be provided to a fixed off time and counter unit logic (FOTCU) 645. According to a preferred embodiment of the present invention, the output 641 of the flip flop 640 can be provided to a "start" input of the FOTCU 645. When the "start" input is active, the FOTCU 645 may begin operation.

According to a preferred embodiment of the present invention, the FOTCU 645 can be used to count a number of clock cycles of a clock at its "clock" input. A clock 650 of a specified frequency may be used to provide the required clock input. When the "start" input becomes active (when the flip flop 640 is set, i.e., when the output voltage may be equal to or greater than the reference voltage), the FOTCU 645 asserts an active value on an "off_time" output 646. The "off_time" output 646 can be used to force the HCSR 600 to turn off. The "off_time" output 646 can be provided to a logic gate 655 (preferably a NOR gate). A second input to the logic gate 655 can be the output of the comparator 620, which was also provided to the flip flop 640. When the "off_time" output 646 is active, an output of the logic gate 655 becomes inactive and turns off the NMOS transistor 605.

After a specified amount of time (perhaps determined by the FOTCU 645 by counting a predetermined number of clock cycles), the FOTCU 645 can assert an active value on a "finish" output 647. The FOTCU 645 may also assert an inactive value on the "off_time" output 646. By asserting the "finish" output 647 (which is preferably coupled to the reset (R) input of the flip flop 640), the flip flop 640 can be cleared. While the "off_time" output 646 has been active (and the HCSR 600 has been off), the output voltage has been discharging. Then, according to a preferred embodiment of the present invention, when "finish" output 647 becomes active, the HCSR 600 turns back on. With the HCSR 600 on, the output voltage may begin to increase (recharge) since it is once again coupled to the supply voltage 505. When the output voltage becomes equal to (or exceeds the reference voltage), the comparator 520 can set the flip flop 640 and the FOTCU 645 can once again force the HCSR 600 off. This sequence of event can continue repeatedly until stopped.

According to a preferred embodiment of the present invention, the HCSR 600 can adjust its operation depending upon the magnitude of the supply voltage. For example, if the magnitude of the supply voltage is small, then the amount of time that the HCSR 600 remains on will be large, since the amount of time that it takes for the decayed output voltage to recharge to a level equal to or greater than the reference voltage can be long. On the other hand, if the magnitude of the supply voltage is large, then the amount of time that the HCSR 600 remains on will be small, since the output voltage recharge time may be short.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A circuit comprising:
a comparator;
a flip flop coupled to an output of the comparator;
a fixed off time/counter unit (FOTCU) coupled to the flip flop, the FOTCU containing circuitry to generate a signal for a specified amount of time and to reset itself once the specified amount of time expires; and
a gate having a first input coupled to the FOTCU and a second input coupled to an output of the comparator, the gate to control the propagation of the output of the comparator when a signal generated by the FOTCU is in a first state.

2. The circuit of claim 1, wherein the flip flop comprises an S-R flip flop, and wherein the output of the comparator is coupled to an S input of the flip flop.

3. The circuit of claim 1, wherein the FOTCU has as an input a reference clock operating at a known frequency, and wherein, when the flip flop asserts an active signal value on its output, the FOTCU begins to generate the signal.

4. The circuit of claim 3, wherein, after the specified amount of time expires, the FOTCU asserts an active signal on a finish signal line to clear the flip flop, and wherein when the flip flop is cleared, the FOTCU stops generating the signal.

5. The circuit of claim 4, wherein the flip flop comprises an S-R flip flop, and wherein the finish signal line is coupled to a R input of the flip flop.

6. The circuit of claim 1, wherein the gate comprises a negative-or (NOR) logic gate.

7. The circuit of claim 1, wherein the FOTCU counts a number of clock pulses to determine the expiration of the specified amount of time.

8. A hysteretic controlled switch regulator comprising:
a switch and filter unit (SFU) having an input coupled to an input voltage and an output coupled to a load, the SFU containing circuitry to convert a direct current (DC) voltage into a stable DC output voltage;
a comparator coupled to the SFU, the comparator to compare an output voltage generated by the SFU with a reference voltage; and
a fixed off time unit (FOT) coupled to the comparator and the SFU, the FOT containing circuitry to affect the operation of the SFU,
wherein the FOT comprises:
a flip flop coupled to an output of the comparator;
a fixed off time/counter unit (FOTCU) coupled to the flip flop, the FOTCU containing circuitry to generate a signal for a specified amount of time and to reset itself once the specified amount of time expires; and
a gate having a first input coupled to the FOTCU and a second input coupled to an output of the comparator, the gate to control the propagation of the output of the comparator when the signal generated by the FOTCU is inactive.

9. The hysteretic controlled switch regulator of claim 8 wherein the direct current voltage contains ripple.

10. The hysteretic controlled switch regulator of claim 8, wherein the signal generated by the FOTCU disables the conversion of the input voltage with ripple into the stable DC output voltage.

11. The hysteretic controlled switch regulator of claim 8, wherein the SFU comprises:
a switch coupled to the input voltage, the switch to enable the conversion of the input voltage into the stable DC output voltage when closed; and
a filter coupled to the switch, the filter to eliminate high frequency components.

12. The hysteretic controlled switch regulator of claim 11, wherein the switch is an N-type metal oxide semiconductor (NMOS) transistor.

13. The hysteretic controlled switch regulator of claim 11, wherein the filter comprises a low-pass filter.

14. The hysteretic controlled switch regulator of claim 13, wherein the filter comprises:

an inductor having a first terminal coupled to the switch and a second terminal coupled to the load; and a capacitor having a first terminal coupled to the second terminal of the inductor and a second terminal coupled to an electrical ground.

15. The hysteretic controlled switch regulator of claim 8, wherein the comparator asserts an active value on its output when the output voltage is greater than the reference voltage.

16. The hysteretic controlled switch regulator of claim 8, wherein when the SFU is enabled, the output voltage will rise until the output voltage exceeds the reference voltage, and wherein when the output voltage exceeds the reference voltage, the comparator asserts an active value on its output and the FOTCU generates a signal to disable the SFU.

17. The hysteretic controlled switch regulator of claim 16, wherein a magnitude of the load will determine how rapidly the output voltage rises.

18. The hysteretic controlled switch regulator of claim 17, wherein when the load is small in magnitude, the output voltage will rise slowly.

19. The hysteretic controlled switch regulator of claim 8, wherein the input voltage is a rectified voltage produced by an alternating current (AC) adaptor.

20. The hysteretic controlled switch regulator of claim 19 wherein the direct current voltage contains ripple.

* * * * *